Oct. 16, 1923.
R. R. ROYAL ET AL
1,471,285
WHEEL QUARTERING GAUGE
Filed May 9, 1922
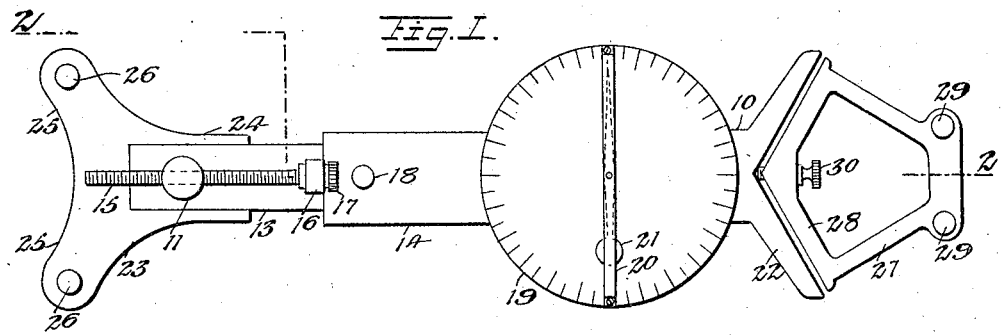
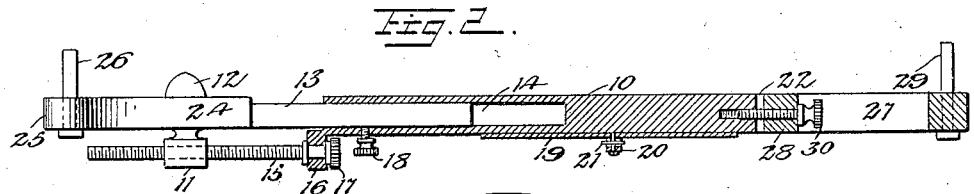
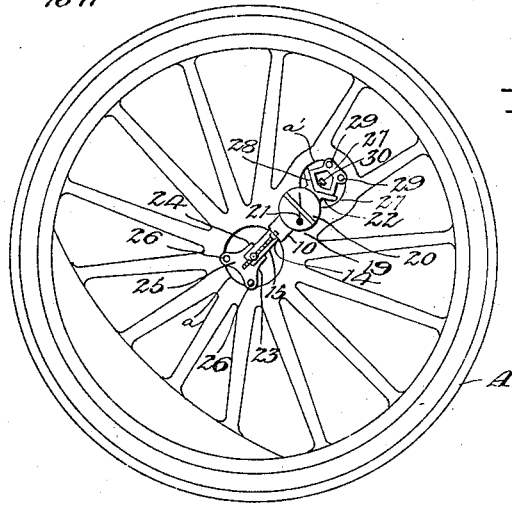
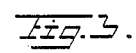
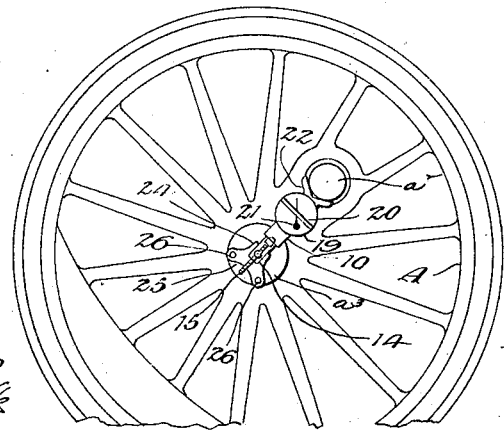
WITNESSES
INVENTORS
R. R. Royal
D. H. Brown
BY
ATTORNEYS Patented Oct. 16, 1923.

1,471,285

UNITED STATES PATENT OFFICE.

ROBERT R. ROYAL AND DANIEL HINES BROWN, OF McCOMB, MISSISSIPPI.

WHEEL-QUARTERING GAUGE.

Application filed May 9, 1922. Serial No. 559,517.

*To all whom it may concern:*

Be it known that we, ROBERT R. ROYAL and DANIEL H. BROWN, citizens of the United States of America, and residents of Mc-Comb, in the county of Pike and State of Mississippi, have invented a new and Improved Wheel-Quartering Gauge, of which the following is a description.

Our invention relates to gauges for quartering the wrist pins of locomotive drive wheels and more particularly relates to attachments for said gauges whereby to effectively gauge and position the wheels with the wrist pins accurately quartered or at right angles before permanently driving the wheels onto the axle.

The general object of our invention is to provide end attachments engageable respectively in the bore of the wheel and in the bore for the wrist pin and adapted for use on the gauge equipped with a lateral member adjacent to one end to enter the usual end recess in the axle and provided with a flaring member or "fishtail" at the opposite end to be pressed against the wrist pin so that the gaging by the attachment may be tested with respect to the said usual axle and wrist pin engaging members.

The nature of the invention and its distinguishing features and advantages will clearly appear as the description procceds.

Reference is to be had to the accompanying drawings forming a part of this specification, it being understood that the drawings are merely illustrative of one example of the invention.

Figure 1 is a face view of a gauge of known form and equipped with our attachment;

Figure 2 is a section as indicated by the line 2—2, Figure 1;

Figures 3 and 4 are diagrammatic views indicating the manner of using a gauge.

In the illustrated example is shown a known form of gauge having an elongated flat body 10 adjacent to one end of which is a lateral element 11, one end 12 of which is adapted as usual to enter the end recess of an axle. The said element 11 is on a shank 13 which telescopes in the tubular end 14 of the body 10. The numeral 15 indicates the usual adjusting screw for the element 11, said screw being swivelled at one end to a lug 16 on the body 10 provided with a knurled head 17 for turning the screw. The numeral 18 indicates the set screw for the shank 13. In the body 10 is supported the usual dial 19 having a diametrically disposed bar 20 and a pivoted pointer 21. Said disk 19, bar 20 and pointer 21 are well known and form no part of our invention. The body 10 at the opposite end from the member 11 is provided with a flaring terminal or "fishtail" 22, as usual, adapted to bear against the wrist pin of the wheel as will appear.

In accordance with our invention we provide for the shank 13 an attachment designated generally by the numeral 23, said attachment having a short flat shank 24 adapted to be secured by brazing or other suitable means to said shank 13. The end of the attachment 23 has divergent arms 25 provided with lateral pins 26.

At the opposite end of the gauge from the attachment 23 we provide a separate attachment 27, one end of which 28 is made V-shaped to conform approximately to the wrist pin-engaging member 22 of the gauge. On the outer end of the attachment 27 are two pins 29 spaced laterally. A set screw 30 at the end 28 of attachment 27 connects said attachment 27 with body 10 and serves to adjust said attachment lengthwise of the gauge to vary the distance between the fishtail 22 and attachment 27 and thereby vary the total effective length of the gauge equipped with the attachments.

With the above described assemblage pins 26 are disposed in the bore or eye $a$ of the locomotive wheel A with the body of the gauge disposed in the direction of the wrist pin bore $a'$, the pins 29 being disposed in said bore $a'$. The set screw 30 is adjusted so that the pins 26 and 29 will be pressed respectively against the wall of the wheel bore $a$ and against the wrist pin bore $a'$ to accurately place gauge in position. In applying the gauge the wrist pin A' is disposed at the proper angle or in the proper radial position relatively to a vertical line passing through the wheel bore $a$ and thereby the pointer 21 will gravitationally assume a perpendicular position, said position being noted. The other wheel of the axle is then turned through 90° to bring the wrist pin bore $a'$ at the opposite side of a vertical line passing through the center of the main bore $a$ of the wheel A until the pointer 21 indicates precisely a movement of the pointer through 90°; the position of the two wheels being thus accurately ascertained the wheels are driven onto the axle. The attachment 27 is now detached and the "fishtail" 22 is placed against said wrist pin A² (Figure 4), the screw 15 being adjusted to register the end 12 of gauge member 11 with the end recess of the axle A³, whereby the gaging of the wrist pin positions may be checked up with the preliminary gaging effected through the medium of the attachments 23, 27.

We would state in conclusion that while the illustrated example constitutes a practical embodiment of our invention, we do not limit ourselves strictly to the exact details herein illustrated, since, manifestly, the same can be considerably varied without departure from the spirit of the invention as defined in the appended claims.

Having thus described our invention, we claim:

1. A quartering gauge having means adjacent its opposite ends to engage respectively in the end recess of the axle, and a wrist pin of the wheel as usual and having an extension at each end beyond the said gauge means, each of the end extensions having laterally projecting members at a face of the gauge to enter respectively in the main bore of the wheel and in the wrist pin bore thereof.

2. A quartering gauge of the type having gauge means adjacent its opposite ends to engage respectively in the end recess of the axle and in the wrist pin of the wheel; together with end attachments beyond the respective gauge means, said end attachments having each a pair of pins projecting laterally from a face of the gauge, the pins of one pair being spaced a greater distance than the pins of the other pair, whereby the one pair may enter the main bore of the wheel to be gaged and the other pair may be entered in the wrist pin bore of the wheel.

3. The combination with a quartering gauge having means to engage respectively with the recessed end of an axle and with the wrist pin, of end extensions on the gauge beyond the first mentioned means, one end extension being detachably secured, said extensions each having laterally projecting means to enter respectively in the main bore of a wheel and in the wrist pin bore thereof.

ROBERT R. ROYAL.
DANIEL HINES BROWN.